United States Patent
Schlittenbauer

(10) Patent No.: US 10,814,834 B2
(45) Date of Patent: Oct. 27, 2020

(54) METHOD FOR OPERATING A CENTRAL LOCKING APPARATUS, CENTRAL LOCKING APPARATUS, AND MOTOR VEHICLE

(71) Applicant: AUDI AG, Ingolstadt (DE)

(72) Inventor: Michael Schlittenbauer, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/338,624

(22) PCT Filed: Jul. 24, 2017

(86) PCT No.: PCT/EP2017/068677
§ 371 (c)(1),
(2) Date: Apr. 1, 2019

(87) PCT Pub. No.: WO2018/086773
PCT Pub. Date: May 17, 2018

(65) Prior Publication Data
US 2020/0172054 A1    Jun. 4, 2020

(30) Foreign Application Priority Data

Nov. 9, 2016    (DE) .................. 10 2016 221 924

(51) Int. Cl.
*E05B 77/48*    (2014.01)
*B60R 25/24*    (2013.01)
(Continued)

(52) U.S. Cl.
CPC .............. *B60R 25/24* (2013.01); *B60R 25/01* (2013.01); *B60R 25/32* (2013.01); *B60R 25/33* (2013.01);
(Continued)

(58) Field of Classification Search
CPC ......... B60R 25/24; B60R 25/01; B60R 25/32; B60R 25/33; E05B 77/54; G01C 21/3611
See application file for complete search history.

(56) References Cited

U.S. PATENT DOCUMENTS 5,170,431 A * 12/1992 Dawson ............. G07C 9/00309
340/5.26
6,563,416 B1    5/2003 Zintler
(Continued)

FOREIGN PATENT DOCUMENTS

CN    104097607 A    10/2014
CN    203888750 U    10/2014
(Continued)

OTHER PUBLICATIONS

International Preliminary Report on Patentability directed to related International Patent Application No. PCT/EP2017/068677, dated May 14, 2019, with attached English-language translation; 10 pages.
(Continued)

*Primary Examiner* — Munear T Akki
(74) *Attorney, Agent, or Firm* — Sterne, Kessler, Goldstein & Fox P.L.L.C.

(57) ABSTRACT

The invention relates to a method for operating a central locking apparatus of a motor vehicle, which is locked by a central locking system of the central locking apparatus as a result of driving above a minimum speed threshold, and is then decelerated to below the minimum speed, wherein in order to subsequently unlock the central locking system, an instantaneous geoposition (GP) emitted from a portable mobile terminal, is first received by means of a detection device of the central locking apparatus. The emitted instantaneous geoposition (GP) of the portable mobile terminal is subsequently evaluated by means of a control device of the central locking apparatus, wherein when evaluating the
(Continued)

instantaneous geoposition (GP), the control device checks whether the emitted instantaneous geoposition (GP) is within a delimited, predetermined region, which is stored in the control device. The central locking system is finally unlocked when the emitted instantaneous geoposition (GP) is within the delimited, predetermined region.

21 Claims, 1 Drawing Sheet

(51) Int. Cl.
*B60R 25/01* (2013.01)
*B60R 25/32* (2013.01)
*B60R 25/33* (2013.01)
*E05B 77/54* (2014.01)
*G01C 21/36* (2006.01)

(52) U.S. Cl.
CPC .......... *E05B 77/54* (2013.01); *G01C 21/3611* (2013.01); *B60R 2325/101* (2013.01); *B60R 2325/205* (2013.01)

(56) References Cited

U.S. PATENT DOCUMENTS

| | | | |
|---|---|---|---|
| 7,683,764 B2* | 3/2010 | Kurpinski | B60R 25/2036 340/426.36 |
| 2003/0152088 A1* | 8/2003 | Kominami | B60N 2/0248 370/401 |
| 2006/0085128 A1 | 4/2006 | Grafe et al. | |
| 2007/0203618 A1 | 8/2007 | McBride et al. | |

FOREIGN PATENT DOCUMENTS

| | | |
|---|---|---|
| DE | 102012020414 A1 | 4/2014 |
| DE | 102013206197 A1 | 10/2014 |
| DE | 102013015478 A1 | 3/2015 |
| DE | 102015015886 A1 | 7/2016 |
| EP | 1013860 A1 | 6/2000 |

OTHER PUBLICATIONS

International Search Report and Written Opinion of the International Searching Authority directed to related International Patent Application No. PCT/EP2017/068677, dated Oct. 18, 2017, with attached English-language translation; 16 pages.

* cited by examiner

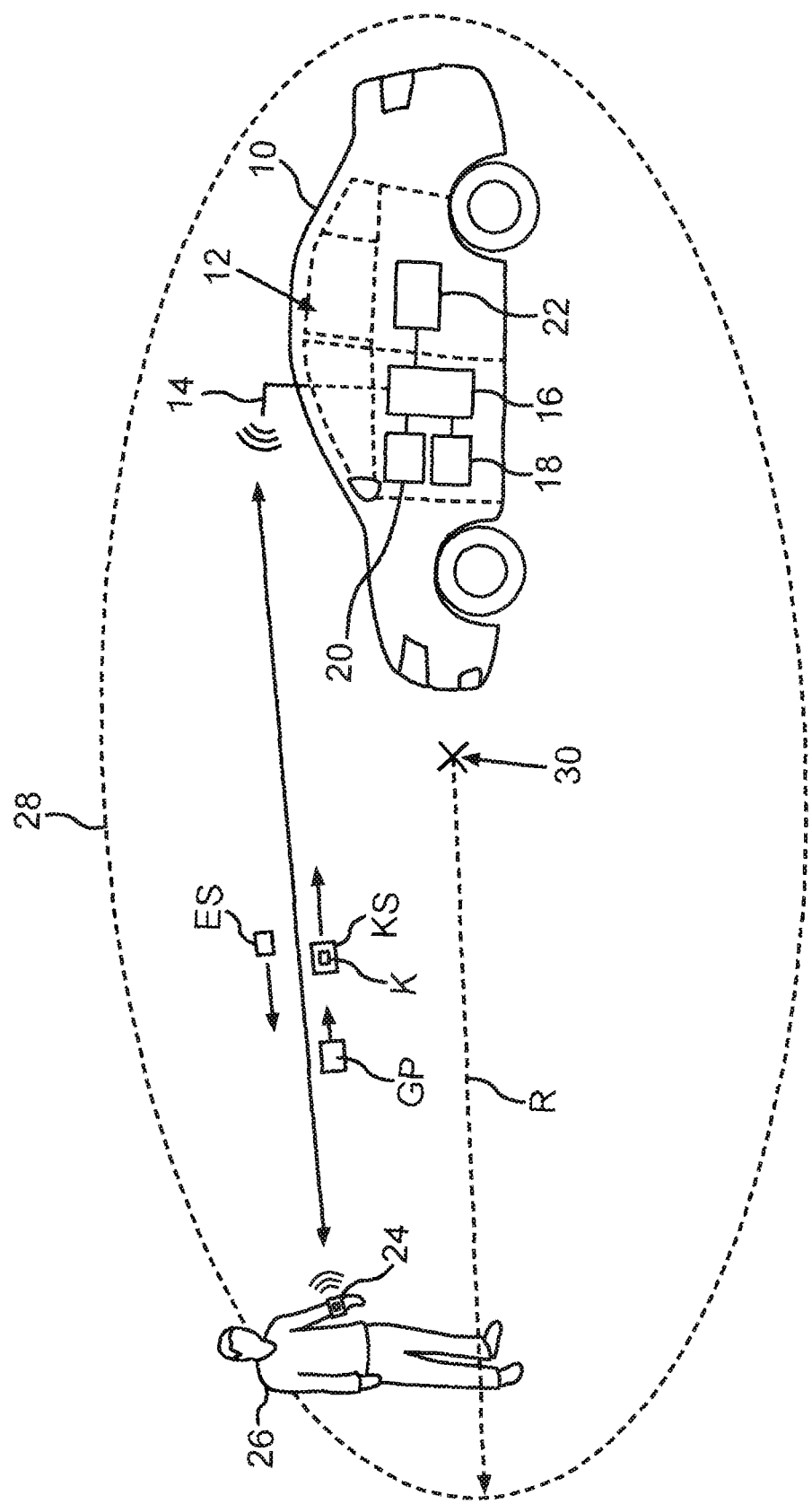

METHOD FOR OPERATING A CENTRAL LOCKING APPARATUS, CENTRAL LOCKING APPARATUS, AND MOTOR VEHICLE

The invention relates to a method for operating a central locking apparatus. The invention also includes a central locking apparatus, which is operable according to the method according to the invention. Finally, the invention also comprises a motor vehicle that includes the central locking apparatus according to the invention.

Central locking apparatuses are known from the general state of the art, which automatically activate the central locking system and thus lock the vehicle from the inside when driving above a speed of, for example, 30 km/h. This means, a driver or a passenger of the vehicle may get out, but there is no access to the motor vehicle possible from the outside. This system prevents an unauthorized opening of the doors of the motor vehicle from the outside during a drive with the motor vehicle, for example, when stopping at traffic lights. To unlock the central locking system, the driver or passenger may, for example, actuate a control element such as, for example, an unlock button, in the interior of the motor vehicle. If a person wishes to access the motor vehicle, the driver must first unlock the central locking system by actuating a control element.

Further technical designs for unlocking the central locking system are known from the prior art.

A method for controlling multiple closing devices of a motor vehicle is known, for example, from DE 10 2012 020 414 A1. The closing devices in this case are each assigned to a detection area that encompasses an area of the motor vehicle, in or at which the respective closing device is situated. When a motor vehicle driver approaches, the approach is detected in the detection area assigned to the closing device and the closing device is unlocked.

DE 10 2013 206 197 A1 specifies a method for controlling a central locking arrangement in a motor vehicle having multiple vehicle doors. The central locking arrangement includes locking actuators and a control device, which is operatively connected to the locking actuators for selective locking or unlocking. The control device is adapted to detect vehicle operating parameters and to implement an individual locking behavior of the individual vehicle doors as a function of the detected vehicle operating parameter.

A closing device for a motor vehicle having multiple doors is described in EP 1 013 860 A1. The closing device comprises a portable transmitter and a receiver for a code of the transmitter to be mounted on the motor vehicle. The closing device further comprises a control device for activating locks of the doors and for detecting a position of the portable transmitter. The control device is further adapted to activate at least one of the locks provided as a function of the position of the transmitter.

In DE 10 2013 015 478 A1, a method is described for recognizing at least one mobile communication device within a radius to be defined around a reading device of a motor vehicle. In this method, an instantaneous position of the motor vehicle and an instantaneous position of the communication device are determined. The two positions are subsequently compared with one another in order to ascertain whether the position of the communication device is located within the radius.

The design of such central locking arrangements or closing devices is especially complex.

The object of the present invention, therefore, is to simplify a method for operating a central locking apparatus, a central locking apparatus, as well as a motor vehicle that includes a central locking apparatus, and at the same time to enhance the safety and comfort of the vehicle occupants during a drive with the motor vehicle.

The object is achieved by the subject matters of the independent claims. Advantageous refinements of the invention are disclosed by the features of the dependent claims, by the following description and by the FIGURE.

According to the invention, this object is achieved by a method for operating a central locking apparatus of a motor vehicle, which has been locked by a central locking system of the central locking apparatus, as a result of driving above a minimum speed and has then been decelerated to below the minimum speed. To subsequently unlock the central locking system, an instantaneous geoposition of a portable mobile terminal, which emits the geoposition, is received by means of a detection device of the central locking apparatus. The portable mobile terminal in this case is preferably not part of the motor vehicle. For example, the portable mobile terminal emits the geoposition from outside the motor vehicle. Alternatively, the portable mobile terminal may also be situated in the motor vehicle and may emit the geoposition from there.

The instantaneous geoposition of the portable mobile terminal is then evaluated by means of a control device of the central locking apparatus, wherein, when evaluating the instantaneous geoposition, the control device checks whether the instantaneous geoposition is within a delimited, predetermined region, which is stored in the control device. Finally, the central locking system of the motor vehicle is unlocked by means of the control device if the instantaneous geoposition is within the delimited, predetermined region. In other words, to unlock the central locking system, an unlocking criterion, namely, the detected instantaneous geoposition within the delimited, predetermined region may have to be met.

By coordinating the instantaneous geoposition of the portable mobile terminal, it is ensured that unlocking occurs only if the portable mobile terminal is located at a predefined position, namely, within the delimited, predetermined region. By coordinating the position for the purpose of unlocking the central locking system, the safety of the driver or passenger, in particular, from an unauthorized opening or access from outside into the motor vehicle is also guaranteed by the central locking apparatus during a drive with the motor vehicle. At the same time, the comfort for the driver or the passenger is enhanced, in that the central locking system is automatically unlocked without the driver or passenger manually actuating an unlock button.

A central locking system is preferably an apparatus, with which all vehicle doors in the motor vehicle may be simultaneously locked. "Locking" in this case means, in particular, that the vehicle doors are closed, i.e., cannot be opened. The vehicle doors are particularly preferably locked from the inside when the central locking apparatus is locked. This means, a driver or passenger is able to open the vehicle doors from the inside, i.e. from an interior of the motor vehicle. The vehicle doors, when locked, cannot be opened from the outside.

"Delimited, predetermined region" preferably means a geographical area, which is established by boundaries. In other words, the delimited, predetermined region may define a closed geographical area. "Geoposition" preferably means geographic coordinates of a position of the portable mobile terminal.

In the present invention, the central locking system is locked or activated if after the start of a drive with the motor vehicle, a minimum speed is achieved or acceleration occurs to above the minimum speed. The minimum speed is a value of a driving speed of the motor vehicle. The minimum speed may, for example, have a value of between 5 km/h and 40 km/h, in particular, a value of 30 km/h. If the central locking system of the motor vehicle is locked, then the central locking system remains locked until an instantaneous geoposition of the portal mobile terminal is received by a detection device and this instantaneous geoposition is within a delimited, predetermined region, in particular, outside the motor vehicle. In addition, the control device checks, in particular, in an evaluation phase, whether the instantaneous geoposition of the portable mobile terminal is within the delimited, predetermined region, i.e., within a predetermined area. If the instantaneous geoposition of the portable mobile terminal is not within the delimited, predetermined region, then the central locking system preferably remains locked.

Once the central locking system is unlocked, a person located outside the motor vehicle and carrying the portable mobile terminal may open a vehicle door of the motor vehicle and climb into the motor vehicle. Alternatively or in addition, it may also be provided that once the central locking system is unlocked, a person located inside the motor vehicle and carrying the portable mobile terminal may open a vehicle door of the motor vehicle and climb out of the motor vehicle. In order for the person to climb in our climb out, the motor vehicle must be brought to a stop.

In order for the delimited, predetermined region to be specified, one embodiment provides that the delimited, predetermined region is established by specifying a radius around a predetermined geoposition, in particular, before the drive. A user or a driver or a passenger of the motor vehicle may, for example, specify or input a region or an area. For this purpose, the central locking apparatus may include a central computer. Using an input device of the central computer, the user may input the delimited, predetermined region. The central computer may include a navigation system for inputting the predetermined geoposition. The user may, for example, specify a geograpical coordinate or geographical coordinates as the predetermined geoposition. Subsequently, the user may specify or establish a radius around the coordinate in order to establish the region. The specification of a predetermined region around a coordinate may also be referred to as "geofencing." Thus, the user may specify a geofence. If, for example, the user picks up the passenger daily or on workdays from the same location—the predetermined geoposition—in a locality, he/she may then establish this location via the delimited, predetermined region. For example, the user may pick up children from school. The user may then specify the geoposition of the school, i.e., the predetermined geoposition and extend a radius around the school in order to establish the delimited, predetermined region. The user may, for example, input the locality, the street and the house number as the predetermined geoposition in a navigation system. In this case, the central computer may include the navigation system. The radius in this case may extend between 5 meters and 100 meters around the predetermined geoposition. Instead of extending a radius around a predetermined geoposition, it may also alternatively be provided to place a square as the delimited, predetermined region around the predetermined geoposition, so that the predetermined geoposition forms the center point of the square. In additional or alternatively, the user may also establish multiple delimited regions. The user may determine and establish the regions him or herself at which an access by additional persons is desired. This results in the advantage that the specification of a delimited and predetermined region is ensured in a particularly simple and reliable manner.

The central locking system is advantageously unlocked only if, upon receipt of the instantaneous geoposition of the portable mobile terminal, the motor vehicle is also located within the delimited, predetermined region. If, therefore, the user establishes the delimited, predetermined region around a predetermined geoposition, the central locking system may first or only be unlocked when the portable mobile terminal and the motor vehicle are located within the boundaries of the delimited, predetermined region. The instantaneous position of the motor vehicle may also be detection by an additional detection device of the central locking apparatus. The additional detection detection device may be designed, for example, as a navigation system or as a GPS tracker. With the additional specification that the portable mobile terminal and the motor vehicle must stop or be located within the delimited, predetermined region in order for the central locking system to be unlocked, an additional safety criterion must be met, as a result of which the safety is further enhanced when operating the central locking apparatus.

According to one advantageous refinement, it is provided that the central locking system is unlocked only if the motor vehicle ignition is switched on and/or a radio key is detected in the vehicle interior. As a result, at least one additional condition, in addition to the position specification of the portable mobile terminal, is required to unlock the central locking system. In other words, the unlocking criterion may include an additional condition. If the detection device detects that the portable mobile terminal is located within the delimited, predetermined region, then it may be also detected and checked by means of the control device whether the motor vehicle ignition is switched on or activated and/or whether the motor vehicle radio key is located in the vehicle interior of the motor vehicle. If the motor vehicle ignition is switched on and/or the radio key is detected and the portable mobile terminal is located within the delimited, predetermined region, then the central locking system is unlocked. Thus, to unlock the central locking system, the motor vehicle must preferably be in operation and/or the radio key must be located in the motor vehicle. For example, the radio key may be detected if it is mounted in an ignition switch of the motor vehicle. This results in the advantage that the safety of the occupants of the motor vehicle may be further enhanced, since, at least two conditions for unlocking the central locking system are checked by the control device.

Another embodiment provides that an identifier of the portable mobile terminal is received by the detection device and is compared with at least one identifier stored in the control device, wherein the central locking system is unlocked only if the identifier received also matches the at least one identifier. The identifier of the portable mobile terminal is received preferably during or after reception of the instantaneous geoposition of the portable mobile terminal. For this purpose, the control device compares the received identifier, in particular, in an evaluation phase, with the identifier stored in the control device. The evaluation phase may begin, for example, once the detection device receives the identifier signal or the instantaneous geoposition of the portable mobile terminal. The portable mobile terminal in this case is located preferably outside the motor vehicle, i.e., in a surroundings of the motor vehicle. The identifier that is stored in the control device may, for example, be stored or saved in a memory of the control device. Multiple identifiers may also be stored in the control device.

The user may specify or input one or multiple identifiers so that the identifier or multiple identifiers are stored in the control device. The central locking apparatus includes the central computer for storing the identifier or identifiers. Using the input device of the central computer, it is possible for the user to input the identifier or multiple identifiers of one or of multiple portable mobile terminals. Alternatively, a teaching process for storing the identifiers may also take place. In this case, the detection device may detect one or multiple portable mobile terminals and query their identifier. The user may then be shown the identifier or multiple identifiers of detected portable mobile terminals on a screen of the input device, which is mounted, for example, on a center console in an interior of the motor vehicle. Upon confirmation by the user, the detected identifier or the detected identifiers may be stored in the control device. The confirmation by the user may occur by way of a confirmative action such as, for example, pressing a control element of the input device.

If the detected identifier conveyed via the identifier signal by the portable mobile terminal does not match the identifier stored in the control device, then the central locking system preferably remains locked.

An authentication or identification of the portable mobile terminal is preferably carried out by a comparison of the identifiers—the received identifier and the identifier stored in the control device. A "comparison of the identifiers" means here, in particular, that a key of the portable mobile device is verified with a key stored in the control device. For this purpose, the detection device may be adapted to emit a detection signal and to receive an identifier signal from the portable mobile terminal. The portable mobile terminal may be adapted to output the identifier signal upon receipt of the detection signal. By emitting the detection signal, the detection device is able to query the identifier, in particular, a digital identifier or the key of the portable mobile terminal.

The comparison of the identifiers ensures that the central locking system is unlocked only via an authorized identifier of the portable mobile terminal in a surroundings of the motor vehicle. By matching the identifiers for unlocking the central locking system, the safety of the driver or of the passenger, in particular, from an unauthorized opening or access into the motor vehicle from the outside is further ensured by the central locking apparatus during a drive with the motor vehicle.

A time of day is advantageously detected when receiving the instantaneous geoposition, wherein the central locking system is opened only if the time of day at which the instantaneous geoposition was received is within a time window stored in the control device. "Time window" preferably means a time period. If, for example, the user wishes to pick up children from school on workdays and school ends at 1:00 pm, the user may then specify as a time window, for example, a time between 1:00 pm and 1:30 pm. Alternatively or in addition, a date, i.e., a predetermined day, may also be specified, in addition to the time window. With the additional locking criterion of the time window and/or of the date, it is possible to avoid an errant unlocking of the central locking system and in this way to further enhance the safety of the vehicle occupants.

One or multiple vehicle doors of the motor vehicle may be advantageously unlocked when the central locking system is deactivated, wherein the vehicle doors are unlocked as a function of a seat occupancy in an interior of the vehicle and/or as a function of the approach of a vehicle door from the outside by the portable mobile terminal. The central locking apparatus may include an additional detection device for detecting a seat occupancy and/or for detecting an approach. The additional detection device for detecting the seat occupancy may comprise a camera that is directed at a vehicle interior of the motor vehicle, and/or a seat occupancy sensor. To recognize an approach, the additional detection device may include a camera, for example, which is directed at the surroundings of the motor vehicle. With the detection of the seat occupancy and/or of the approach, only those vehicle doors are opened, next to which a seat is unoccupied or the door which is approached by a person.

In order to carry out the method according to the invention, the invention also provides a central locking apparatus for the motor vehicle. A control device of the central locking apparatus is adapted to lock a central locking system as a result of driving the motor vehicle above a minimum speed. The central locking apparatus comprises a detection device, which is adapted to receive an instantaneous geoposition of a portable mobile terminal, which emits the geoposition. The central locking apparatus also includes a control device, which is adapted to evaluate the instantaneous geoposition of the portable mobile terminal, wherein when evaluating the instantaneous geoposition, the control device is adapted to check whether the instantaneous geoposition is within a delimited, predetermined region, which is stored in the control device. Moreover, the control device is adapted to unlock the central locking system when the motor vehicle has been decelerated to below the minimum speed and the instantaneous geoposition is within the delimited predetermined region.

One advantageous refinement of the invention provides that the portable mobile terminal is designed as a mobile telephone or as an electric watch, in particular, as a smartwatch, or as a tablet computer or as augmented reality glass (AR glasses) or as a headset.

The detection device is advantageously designed as a roof antenna and/or the detection device is adapted to receive a WLAN signal or a Bluetooth signal or a GPS signal. The WLAN standard is an IEEE 802.11, for example. The IEEE 802.11 refers to an IEEE standard for communication in wireless networks. The portable mobile terminal is able to communicate with the motor vehicle via Bluetooth and/or via a wireless local network, i.e., wirelessly. In this case, the detection unit may be adapted to receive a WLAN signal or Bluetooth signal as an identifier signal. The Bluetooth signal delivers a MAC address, for example. This results in the advantage that a communication network may be designed in a particularly simple and reliable manner.

It is provided, in particular, that the central locking apparatus is implemented in a motor vehicle. Accordingly, the invention also provides a motor vehicle having an embodiment of the central locking apparatus according to the invention. The motor vehicle according to the invention is preferably designed as a car, in particular, as a passenger car.

The advantages and preferred embodiments described for the method according to the invention also apply to the motor vehicle according to the invention and to the central locking apparatus according to the invention and vice versa.

An exemplary embodiment of the invention is described below. For this purpose, the only FIGURE (FIG.) shows a schematic representation of a motor vehicle 10 having a central locking apparatus 12.

The exemplary embodiment explained below is a preferred embodiment of the invention. The components of the embodiment described in the exemplary embodiment each represent features of the invention to be considered independently of one another, each of which also refines the invention independently of one another and are therefore also to be considered individually or as a component of the invention in a combination other than the combination shown. In addition, the embodiment described may also be supplemented by additional features of the invention previously described.

The central locking apparatus 12 comprises a detection device 14, a control device 16, an input device 18, an additional detection device 20 and a central locking system 22.

The central locking system 22 is adapted to lock vehicle doors of the motor vehicle 1, in particular, from the inside. For example, the motor vehicle 10 may accelerate to above a minimum speed at the start of a drive with the motor vehicle 10. Once a driving speed of the motor vehicle 10 exceeds the minimum speed of, for example 30 km/h, the control device 16 may be adapted to activate the central locking system 22, which then locks or closes the vehicle doors. The minimum speed or a value of the minimum speed may be stored in a memory (not shown in the FIGURE) of the control device 16. Once the central locking system 22 is locked or activated, the central locking system 22 may then only be unlocked or deactivated by an unlocking criterion, which will be discussed in greater detail below.

In order to be able to unlock the central locking system 22 again and to allow a user to access the motor vehicle 10 after the motor vehicle 10 has started to drive, an instantaneous geoposition GP of a portable mobile terminal 24 is received and evaluated by the detection device 14 of the motor vehicle. The geoposition GP is outputted or emitted by the portal mobile terminal 24 in a surroundings of the motor vehicle 10. The portable mobile terminal 24 may, for example, be a mobile telephone or an electric watch, in particular, a smartwatch, or a tablet computer. The portable mobile terminal 24 may, for example, be carried by a person 26, who would like to access the motor vehicle 10.

In order for the portable mobile terminal 24 to emit the instantaneous geoposition, the detection device 14 may be adapted to output a detection signal ES. The portable mobile terminal 24 is adapted to receive the detection signal 24 and, by receiving the detection signal ES, to output the instantaneous geoposition GP or to convey it to the central locking apparatus 12. For this purpose the portable mobile terminal 24 may output a signal that has the instantaneous geoposition GP. With the aid of the detection signal ES, it is possible to query the instantaneous geoposition GP of the portable mobile terminal 24.

After receiving the instantaneous geoposition GP, the detection device 14 conveys the instantaneous geoposition GP to the control device 16. The control device 16 then evaluates the instantaneous geoposition GP. In the process, the control device 16 checks whether the instantaneous geoposition GP is within a delimited, predetermined region 28. The delaminated predetermined region 28 describes or defines a geographical area. The delimited, predetermined region 28 may be stored in a memory of the control device 16.

The delimited, predetermined region 28 may be specified by a user or by a driver of the motor vehicle 10. The central locking apparatus 12 may include a central computer for such purpose. Using an input device 18 of the central computer, the user is able to input the predetermined region. The user may, for example, specify a predetermined geoposition 30 or coordinate. The input device 18 may be a display, for example. The display may be part of a navigation system. For example, the central computer may include the navigation system for inputting the delimited, predetermined region. The user may specify, for example, a locality, a street name and a house number as a predetermined geoposition 30 in the navigation system. The user may subsequently specify or establish a radius R around the predetermined geoposition 30, in order to establish the delimited, predetermined region 28. The radius R in this case may extend between 5 meters and 100 meters around the predetermined geoposition 30. Instead of extending a radius around the predetermined geoposition 30, it may alternatively also be provided, to place a square as the delimited, predetermined region around the predetermined geoposition 30, so that the predetermined geoposition forms the center point of the square. The user may, additionally or alternatively, also establish multiple delimited, predetermined regions. The specification of a predetermined region around a coordinate may also be referred to as "geofencing". Thus, the user may specify a geofence.

Thus, if the control device 16 detects that the portable mobile terminal 24 is located within the delimited, predetermined region 28, the central locking system 22 may then be unlocked. To unlock the central locking system 22, the control device 16 may, for example, output or emit an unlocking signal to the central locking system 22. The central locking system 22 is unlocked as a result. When the central locking system 22 is unlocked, the vehicle doors of the motor vehicle 10 are opened.

In order to enhance the safety of the vehicle occupants of the motor vehicle 10 when the central locking system 22 is unlocked, it may be provided that an additional unlocking criterion or additional unlocking criteria has/have to be met.

Thus, it may be provided that that to unlock the central locking system 22, it is necessary not only for the portable mobile terminal 24, but also for the motor vehicle 10 itself, to be located within the delimited, predetermined region 28. The instantaneous position of the motor vehicle 10 may also be detected by the additional detection device 20. The navigation system may, for example, constitute the additional detection device 20. Accordingly, the. control device 16 checks the instantaneous geoposition of the portable mobile terminal 24 and the instantaneous position of the motor vehicle 10. If the motor vehicle 10 and the portable mobile terminal 24 are located within the delimited predefined region, the central locking system 22 is then unlocked.

Additionally, it may be provided that in order to unlock the central locking system 22, an identifier K of the portable mobile terminal 24 must match an identifier stored in the control device 16. For this purpose, the detection device 14 may be adapted to query the identifier K of the portable mobile terminal 24, in addition to the geoposition, by outputting the detection signal ES. The portable mobile terminal 24 is adapted to receive the detection signal ES and, by receiving the detection signal ES, to output the identifier signal K. With the aid of the detection signal ES, the identifier K of the portable mobile terminal 24 is queried. The identifier signal KS outputted by the portable mobile terminal 24 includes the identifier K queried by the detection device 14. The identifier signal KS is preferably formed in accordance with a WLAN standard or Bluetooth standard, which is provided for establishing a communication network. Thus, the detection device 14 may further be adapted to receive a WLAN signal or Bluetooth signal as identifier signal KS. In receiving the identifier signal KS, the detection device 14 is adapted to convey or to transmit the identifier K to the control device 16.

The control device 16 is subsequently adapted to compare, in particular, in an evaluation phase, the received identifier K with an identifier stored in the control device 16. More than one identifier may also be stored in the control device 16. The identifiers may, for example, also be stored in the memory of the control device 16.

The user may store one or multiple identifiers. For this purpose, the user may input the identifier or multiple identifiers of one or of multiple portable mobile terminals 24 in the central computer via the input device 18. Alternatively, a teaching process may also take place. In the process, the detection device 14 may detect one or multiple portable mobile terminals and query their identifiers. The identifiers may then be shown to the user on a screen, which is mounted, for example, on a center console in an interior of the motor vehicle 10. The queried identifiers may then be stored in the control device 16 via a confirmation by the user.

The unlocking criterion is met if the received identifier K of the portable mobile terminal 24 matches the identifier stored in the control device 16, and if the portable mobile terminal is located within the delimited, predetermined region 28. The control device 16 may then activate the central locking system 22.

On the whole, the invention describes a method for authorizing a vehicle access.

According to one particularly preferred embodiment, the central locking system is automatically unlocked by analyzing pieces of Bluetooth information and GPS tracking of a portable mobile terminal. Bluetooth, if it is activated on the portable mobile terminal such as, for example, on a smartphone, of a desired passenger, may then be evaluated by the vehicle. Alternatively or in combination, a geofence at a particular location may also be selected, in which vehicle access may occur indiscriminately. To further avoid errant unlockings, the function may be combined with a time of day release and/or a date. Bluetooth supplies an unambiguous MAC address of the portable mobile terminal that cannot be falsified. The address may be evaluated and stored when connected to the central computer of the motor vehicle. The motor vehicle has a GPS position. The GPS position of the motor vehicle may be detected by a detection device of the motor vehicle. The geofence may be set in the vehicle, for example, by the user, once the motor vehicle is situated at the desired location. A radius around the coordinate may also be specified.

If, for example, the user wishes to pick up children from school each workday or to pick up a passenger in a ride share, then access at a speed of the motor vehicle of 0/km/h, i.e. when the motor vehicle is stopped, may be granted by specifying the geofence and/or by the teaching of the Bluetooth ID.

The invention claimed is:

1. A method for operating a central locking apparatus of a motor vehicle, wherein the motor vehicle is locked by a central locking system of the central locking apparatus as a result of driving above a minimum speed, wherein the motor vehicle then decelerates to below the minimum speed, the method comprising:
   receiving an instantaneous geoposition from a portable mobile terminal, which emits the instantaneous geoposition, by means of a detection device of the central locking apparatus;
   evaluating the instantaneous geoposition of the portable mobile terminal by means of a control device of the central locking apparatus, wherein during such evaluation, the control device checks whether the instantaneous geoposition is within a delimited, predetermined region, which is stored in the control device; and
   unlocking the central locking system of the central locking apparatus, if the instantaneous geoposition is within the delimited, predetermined region,
   wherein the delimited, predetermined region is independent of a geoposition of the motor vehicle.

2. The method of claim 1, wherein the delimited, predetermined region is established by specifying a radius around a predetermined geoposition.

3. The method of claim 1, wherein the central locking system is unlocked only if the motor vehicle is also located within the delimited, predetermined region when the emitted instantaneous geoposition of the portable, mobile terminal is received.

4. The method of claim 1, wherein the central locking system is unlocked only if an ignition of the motor vehicle is switched on and/or a radio key is detected in a vehicle interior of the motor vehicle.

5. The method of claim 1, further comprising:
   receiving, by the detection device, an emitted identifier from the portable mobile terminal; and
   comparing the emitted identifier with at least one identifier stored within the control unit,
   wherein the central locking system is unlocked only if the emitted identifier also matches the at least one identifier stored within the control unit.

6. The method of claim 1, further comprising:
   detecting a time of day when receiving the instantaneous geoposition,
   wherein the central locking system is unlocked only if the time of day at which the instantaneous geoposition was received is within a time window stored in the control device.

7. The method of claim 6, wherein the time window comprises a consecutive span of hours designated by a user of the vehicle.

8. The method of claim 1, wherein the central locking system is unlocked only if an identifier emitted from the portable mobile terminal matches an identifier stored within the control device.

9. The method of claim 8, wherein identifiers are stored within the control device through a teaching process, wherein the detection device may detect one or multiple portable mobile terminals, query their identifiers, and after receiving vehicle user confirmation, the queried identifiers may be stored within the control device.

10. A central locking apparatus for a motor vehicle, wherein a control device of the central locking apparatus is programmed to lock a central locking system as a result of the motor vehicle driving above a minimum speed, the central locking apparatus further comprising:
    a detection unit, which is adapted to receive an instantaneous geoposition from a portable mobile terminal, which emits the instantaneous geoposition,
    wherein the control device is adapted to evaluate the instantaneous geoposition of the portable mobile terminal, wherein during such evaluation, the control device is programmed to check whether the instantaneous geoposition is within a delimited, predetermined region, which is stored within the control device,
    wherein the control device is further programmed to unlock the central locking system of the central locking apparatus if the motor vehicle decelerates to below the minimum speed and the instantaneous geoposition is within the delimited, predetermined region, and wherein the delimited, predetermined region is independent of a geoposition of the motor vehicle.

11. The central locking apparatus of claim 10, wherein the portable mobile terminal comprises a mobile telephone, an electric watch, a smartwatch, a tablet computer, augmented reality glasses, or a headset.

12. The central locking apparatus of claim 10, wherein the detection unit comprises a roof antenna, wherein the detection unit is adapted to receive a WLAN signal or Bluetooth signal.

13. The central locking apparatus of claim 10, wherein the delimited, predetermined region defines a closed geographical area with closed boundaries.

14. The central locking apparatus of claim 13, wherein the delimited predetermined region is chosen by a user of the vehicle to define a radius around the geographic coordinates of a position to thereby establish a geofencing area.

15. The central locking apparatus of claim 14, wherein the control device also includes a navigation system, wherein the user specifies the geographic coordinates of a position by inputting an address into a navigation system.

16. The central locking apparatus of claim 14, wherein the control device also includes a display input device, and wherein the geofencing area is established by user input through the display input device.

17. The central locking apparatus of claim 10, wherein the control device is further programmed to unlock the central locking system of the central locking apparatus only if both the instantaneous geoposition is within the delimited, predetermined region, and the motor vehicle is also simultaneously located within the delimited, predetermined region.

18. The central locking apparatus of claim 10, wherein the control device is further programmed to unlock the central locking system only if an identifier emitted from the portable mobile terminal matches an identifier stored within the control device.

19. The central locking apparatus of claim 18, wherein the identifiers are stored in onboard memory of the control device.

20. A motor vehicle comprising a central locking apparatus, wherein a control device of the central locking apparatus is programmed to lock a central locking system as a result of the motor vehicle driving above a minimum speed, the central locking apparatus further comprising:

a detection unit, which is adapted to receive an instantaneous geoposition from a portable mobile terminal, which emits the instantaneous geoposition, wherein the control device is adapted to evaluate the instantaneous geoposition of the portable mobile terminal, wherein during such evaluation, the control device is programmed to check whether the instantaneous geoposition is within a delimited, predetermined region, which is stored within the control device, wherein the control device is further programmed to unlock the central locking system of the central locking apparatus if the motor vehicle decelerates to below the minimum speed and the instantaneous geoposition is within the delimited, predetermined region, and wherein the delimited, predetermined region is independent of a geoposition of the motor vehicle.

21. The method of claim 1, further comprising:

transmitting a detection signal to the portable mobile terminal to query the instantaneous geoposition of the portable mobile terminal, wherein the receiving is in response to the transmitting.

* * * * *